United States Patent

Matsumoto et al.

[11] Patent Number: 5,850,331
[45] Date of Patent: Dec. 15, 1998

[54] ELECTRIC DOUBLE-LAYER CAPACITOR AND CAPACITOR DEVICE

[75] Inventors: Kenji Matsumoto; Yoshio Yamamoto, both of Wako, Japan

[73] Assignee: Honda Giken Kogyo Kabushiki Kaisha, Tokyo, Japan

[21] Appl. No.: 848,673

[22] Filed: Apr. 29, 1997

[30] Foreign Application Priority Data

Aug. 30, 1996 [JP] Japan ..................................... 8-229670

[51] Int. Cl.⁶ ....................................................... H01G 9/00
[52] U.S. Cl. ......................... 361/502; 361/512; 361/504; 361/525; 429/144
[58] Field of Search .......................... 29/25.03; 361/500, 361/502, 503, 504, 511, 508, 512, 517, 519, 520, 522, 523, 525, 530, 541, 531, 534, 537, 538; 429/129, 144, 146, 247; 252/502

[56] References Cited

U.S. PATENT DOCUMENTS 5,227,960  7/1993  Kunishi et al. ......................... 361/502

FOREIGN PATENT DOCUMENTS 3-94412   4/1991  Japan ..................................... 361/502
3-69222   7/1991  Japan .
4-240708  8/1992  Japan ..................................... 361/502

Primary Examiner—Bot L. Ledynh
Assistant Examiner—Anthony Dinkins
Attorney, Agent, or Firm—Nikaido Marmelstein Murray & Oram LLP

[57] ABSTRACT

An electric double-layer capacitor has an elongate separator impregnated with an electrolytic solution and folded alternately in different directions into folded layers of a predetermined length, and a plurality of stacked electrode plates each disposed between adjacent two of the folded layers of the separator. The electrode plates have opposite polarities confronting each other through the folded layers of the separator. A plurality of flexible collectors are connected to respective ends of the electrode plates and extend from between the folded layers of the separator. The flexible collectors of each of the polarities are bundled in a direction parallel to the electrode plates on one side of the electrode plates and disposed at an outermost layer of the electrode plates with respect to a direction in which the electrode plates are stacked.

19 Claims, 12 Drawing Sheets

ELECTRIC DOUBLE-LAYER CAPACITOR AND CAPACITOR DEVICE

BACKGROUND OF THE INVENTION

1. Field of the Invention

The present invention relates to an electric double-layer capacitor and a capacitor device comprising a plurality of series-connected electric double-layer capacitors.

2. Description of the Related Art

Generally, a boundary across which two different phases of a solid electrode and a liquid contact each other is associated with an electric double layer which comprises positive and negative electric charges that confront each other across a very small distance therebetween. The electrostatic capacity which is created when an electric field is applied to the electric double layer is proportional to the surface area of the boundary at the solid electrode. It is known in the art that when the solid electrode is made of a material having a large specific surface area, such as activated carbon, the electric double layer can be used as a capacitor.

Japanese laid-open utility model publication No. 3-69222 discloses an electric double-layer capacitor. FIG. 12 of the accompanying drawings shows the disclosed electric double-layer capacitor, generally designated by the reference numeral 31. As shown in FIG. 12, the electric double-layer capacitor 31 comprises a meandering separator 32 in the form of an alternately folded elongate web of polyethylene, polypropylene, or the like which is impregnated with an electrolytic solution, and a plurality of planar electrodes 33 of activated carbon each inserted between two adjacent folded layers of the meandering separator 32. The electric double-layer capacitor 31 also has a pair of collectors 35a, 35b positioned one on each side of the meandering separator 32 and the planar electrode 33. The collectors 35a, 35b have teeth 34 projecting inwardly toward each other and connected to the planar electrodes 33 between the folded layers of the meandering separator 32.

The planar electrodes 33 are connected alternately to the different teeth 34, respectively, of the collectors 35a, 35b. Therefore, the planar electrodes 33 serve as different electrodes, respectively, adjacent two of which face each other through one of the folded layers of the meandering separator 32. The electric double-layer capacitor 31 of the above structure may be small in size and large in electrostatic capacity.

However, when the collectors 35a, 35b are installed in place, the teeth 34 tend to contact and damage the meandering separator 32 in the form of an alternately folded web of polyethylene, polypropylene, or the like. If the meandering separator 32 is to be protected from damage due to contact with the teeth 34, then the electric double-layer capacitor 31 has to be manufactured according to a relatively complex process.

SUMMARY OF THE INVENTION

It is therefore an object of the present invention is to provide an electric double-layer capacitor which is relatively small in size, has a relatively large electrostatic capacity, and can be manufactured relatively easily.

Another object of the present invention is to provide a capacitor device comprising a plurality of series-connected electric double-layer capacitors, the capacitor device having a relatively small internal resistance and being capable of producing a high output density per volume.

According to the present invention, there is provided an electric double-layer capacitor comprising an elongate separator impregnated with an electrolytic solution and folded alternately in different directions into folded layers of a predetermined length, a plurality of stacked electrode plates each disposed between adjacent two of the folded layers of the separator, the electrode plates having opposite polarities confronting each other through the folded layers of the separator, and a plurality of flexible collectors connected to respective ends of the electrode plates and extending from between the folded layers of the separator, the flexible collectors of each of the polarities being bundled in a direction parallel to the electrode plates on one side of the electrode plates and disposed at an outermost layer of the electrode plates with respect to a direction in which the electrode plates are stacked.

The flexible collectors connected to the ends of the electrode plates extend from between the folded layers of the separator, and are bundled together for each polarity. Since the collectors are connected to the electrode plates, the separator is prevented from being damaged, and hence the electric double-layer capacitor can easily be manufactured.

As described above, the flexible collectors of each of the polarities are bundled in a direction parallel to the electrode plates on one side of the electrode plates and disposed at an outermost layer of the electrode plates with respect to the direction in which the electrode plates are stacked. The electric double-layer capacitor may serve as a unit cell, and a plurality of unit cells may be stacked in the direction in which the electrode plates are stacked. The bundled collectors positioned at the outermost layers of the electrode plates of the unit cells may easily be connected to each other. Therefore, the electric double-layer capacitors of the unit cells may easily be connected in series.

According to the present invention, there is also provided a capacitor device comprising a plurality of electric double-layer capacitors each of the above structure, the electric double-layer capacitors being stacked in the direction in which the electrode plates are stacked, the bundled flexible collectors of one polarity of one of the electric double-layer capacitors being connected to the bundled flexible collectors of a different polarity of an adjacent one of the electric double-layer capacitors.

In a first aspect of the present invention, the capacitor device further comprises an electrically conductive plate disposed between the electric double-layer capacitors and extending along the electrode plates with the separators interposed therebetween, wherein the bundled flexible collectors of the one polarity of the one of the electric double-layer capacitors are connected to an end of the electrically conductive plate, and the bundled flexible collectors of the different polarity of the adjacent one of the electric double-layer capacitors are connected to an opposite end of the electrically conductive plate.

Alternatively, in a second aspect of the present invention, the bundled flexible collectors of the one polarity of the one of the electric double-layer capacitors and the bundled flexible collectors of the different polarity of the adjacent one of the electric double-layer capacitors are connected to each other in a direction parallel to the electrode plates on one side of the electrode plates.

According to the first aspect, inasmuch as the electrically conductive plate is disposed between the electric double-layer capacitors, the electrically conductive plate serves to keep the electric double-layer capacitors in their shape. Because the bundled collectors of adjacent ones of the electric double-layer capacitors are connected to the same electrically conductive plate, the internal resistance which occurs due to the interconnection of the bundled collectors is reduced.

According to the second aspect, since the bundled flexible collectors of adjacent ones of the electric double-layer capacitors are connected to each other in the direction parallel to the electrode plates on one side of the electrode plates, the internal resistance which occurs due to the interconnection of the bundled collectors is further reduced.

According to the second aspect, furthermore, the bundled flexible collectors of different polarities of adjacent ones of the electric double-layer capacitors may be connected to each other without the intermediary of an electrically conductive plate between the electric double-layer capacitors. However, as with the first aspect, an electrically conductive plate may be disposed between the electric double-layer capacitors, and the bundled collectors may be connected to the electrically conductive plate. The electrically conductive plate thus included may be effective in keeping the electric double-layer capacitors in their shape as with the first aspect.

The capacitor device according to the present invention further comprises a plurality of tubular electrically nonconductive cases each having upper and lower open ends, the electric double-layer capacitors being housed respectively in the cases and surrounded respectively thereby on side surfaces thereof parallel to the direction in which the electrode plates are stacked, the cases being stacked with the electrically nonconductive plate interposed therebetween and joined to each other in sandwiching relation to the electrically nonconductive plate.

Each of the electrically nonconductive cases serves as a housing which houses one of the electric double-layer capacitors, and the electrically nonconductive plate serves as a portion of the housing, i.e., an upper or lower panel thereof. Therefore, the capacity of the electric double-layer capacitor per unit volume is large, increasing the output density of the electric double-layer capacitor.

Each of the electrically nonconductive cases has ribs extending along the upper and lower open ends thereof, further comprising clips which clamp the rib along one of the upper and lower open ends of each of the electrically nonconductive cases and the rib along the other of the upper and lower open ends of an adjacent one of the electrically nonconductive cases, thereby interconnecting the electrically nonconductive cases. The electrically nonconductive cases can thus easily be joined together by clips. The capacitor device which comprises the series-connected electric double-layer capacitors has a desired breakdown voltage.

The capacitor device further comprises electrically nonconductive closure members closing the upper and lower open ends of the stacked cases with the electrically conductive plates interposed therebetween. When the cases are stacked, the upper and lower open ends of the cases are closed by the closure members, thus sealing the electric double-layer capacitors in spaces defined between the cases and the closure members.

Each of the closure members has a socket and a terminal disposed in the socket and connected to one of the electrically conductive plates. The capacitor device can be connected to an external device through the sockets. Each of the closure members has a rib extending along an outer edge thereof, and the capacitor device further comprises clips which clamp the rib along the outer edge of each of the closure members and the rib along the upper and lower open ends of adjacent ones of the electrically nonconductive cases, thereby interconnecting the closure members and the electrically nonconductive cases. The capacitor device with the cases can thus easily be constructed.

Each of the electrically nonconductive cases has an inlet hole for introducing an electrolytic solution therethrough to impregnate the separator, and the capacitor device further comprises a closure element for closing the inlet hole after the electrolytic solution is introduced through the inlet hole. After the electric double-layer capacitors are sealed in spaces defined by the cases and the closure members, an electrolytic solution can be introduced through the inlet holes into the cases. If the internal pressure in the sealed electric double-layer capacitors increases, then the closure element is forced out of the inlet hole, releasing the pressure through the inlet hole which provides communication between interior and exterior spaces of the electric double-layer capacitors.

Alternatively, the capacitor device further comprises a plurality of tubular electrically conductive cases each having upper and lower open ends and an integral electrically conductive plate extending therein and thereacross, the electric double-layer capacitors being housed respectively in spaces defined by the cases and the electrically conductive plates thereof with the electrically conductive plate sandwiched between the electric double-layer capacitors, and surrounded by the cases on side surfaces thereof parallel to the direction in which the electrode plates are stacked, the cases being stacked with insulating members interposed therebetween and joined to each other.

The electrically conductive cases and the electrically conductive plates integral therewith jointly make up housings which house the electric double-layer capacitors. Therefore, the capacity of the electric double-layer capacitor per unit volume is large, increasing the output density of the electric double-layer capacitor.

Each of the electrically conductive cases has ribs extending along the upper and lower open ends thereof, further comprising clips which clamp the rib along one of the upper and lower open ends of each of the electrically conductive cases and the rib along the other of the upper and lower open ends of an adjacent one of the electrically conductive cases, thereby interconnecting the electrically conductive cases. A desired number of such cases can easily be joined by clips. The capacitor device which comprises the series-connected electric double-layer capacitors has a desired breakdown voltage. The clips may be replaced with bolts or other fasteners for interconnecting the cases insofar as those bolts or other fasteners can the cases electrically insulated from each other.

When the cases are stacked, uppermost and lowermost ones of the cases provide spaces which are free of electric double-layer capacitors. The electrically conductive plates integral with those uppermost and lowermost cases serve as upper and lower panels, respectively, of the capacitor device. Therefore, the capacitor device can easily be connected to an external device by leads that are connected to the electrically conductive plates integral with those uppermost and lowermost cases.

To prevent the electrically conductive plates integral with those uppermost and lowermost cases from being exposed for protection of the electrically conductive plates integral, it is preferable to employ closure members of the same electrically nonconductive material as the cases for covering those electrically conductive plates.

Each of the electrically conductive cases has an inlet hole for introducing an electrolytic solution therethrough to impregnate the separator, and the capacitor device further comprises a closure element for closing the inlet hole after the electrolytic solution is introduced through the inlet hole. After the electric double-layer capacitors are sealed in spaces defined by the cases and the closure members, an electrolytic solution can be introduced through the inlet holes into the cases. If the internal pressure in the sealed electric double-layer capacitors increases, then the closure element is forced out of the inlet hole, releasing the pressure through the inlet hole which provides communication between interior and exterior spaces of the electric double-layer capacitors.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
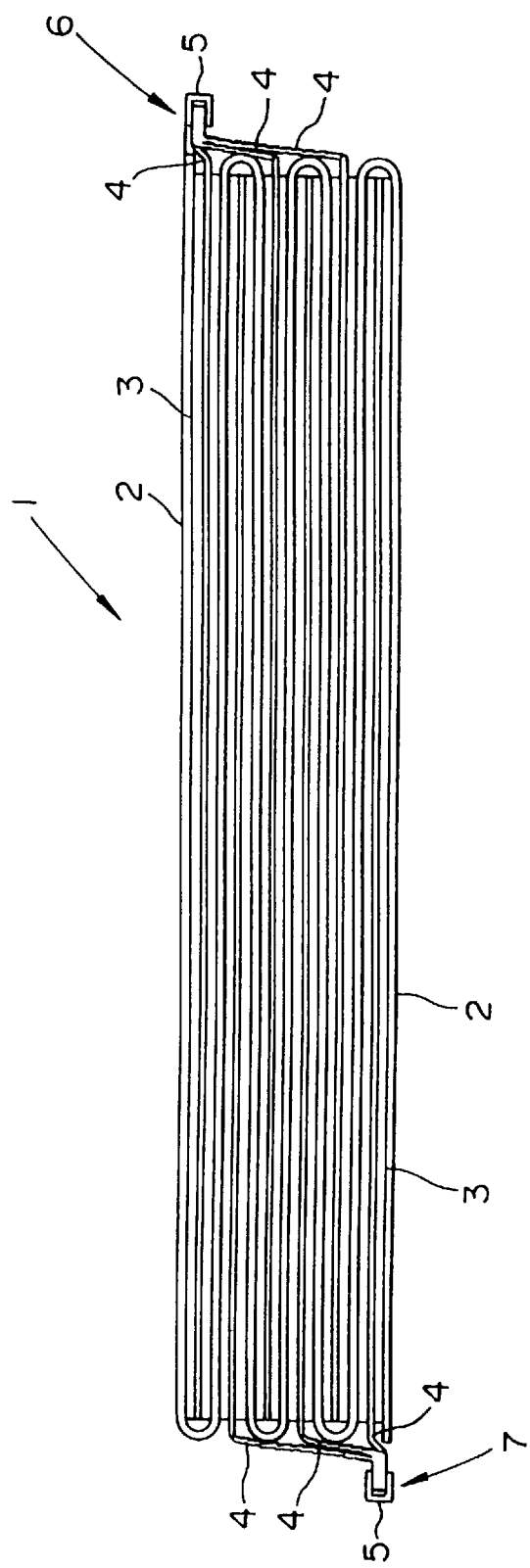
FIG. 1 is a cross-sectional view of an electric double-layer capacitor according to the present invention.

As shown in FIG. 1, an electric double-layer capacitor 1 according to the present invention comprises an elongate separator 2 impregnated with an electrolytic solution and folded alternately in opposite directions into a meandering shape having folded layers of a predetermined length, and a plurality of electrode plates 3 each inserted between two adjacent folded layers of the separator 2. The electric double-layer capacitor 1 also has a plurality of flexible collectors 4 having substantially the same width as the electrode plates 3. The flexible collectors 4 are embedded longitudinally in the electrode plates 3, respectively, and extend the full length of the electrode plates 3.

Each of the electrode plates 3 has an end enclosed by the folded separator 2 and an opposite end exposed from the folded separator 2. The collectors 4 have respective ends projecting from the exposed ends of the electrode plates 3 and extending from between the folded layers of the separator 2. The projecting ends of the collectors 4 are exposed alternately at opposite sides of the electric double-layer capacitor 1. The collectors 4 of one polarity have their projecting ends extending in a direction parallel to the electrode plates 3 from one side of the electrode plates 3, and the collectors 4 of opposite polarity have their projecting ends extending in a direction parallel to the electrode plates 3 from the opposite side of the electrode plates 3. The projecting ends of the collectors 4 of one polarity are bundled and electrically connected together into a bundled structure 6 by a fastener 5 of C-shaped cross section, whereas the projecting ends of the collectors 4 of opposite polarity are also bundled and electrically connected together into a bundled structure 7 by another fastener 5 of C-shaped cross section. The fasteners 5 are made of an electrically conductive material.

In the embodiment shown in FIG. 1, the separator 2 is folded into a meandering shape in a direction parallel to the direction in which the projecting ends of the collectors 4 are connected together by the fasteners 5. However, the separator 2 may be folded into a meandering shape in a direction perpendicular to the direction in which the projecting ends of the collectors 4 are connected together by the fasteners 5.

The bundled structures 6, 7 are positioned respectively at different outermost layers of the electrode plates 3 of different polarities. For example, the bundled structure 6 is positioned at an uppermost layer (as shown in FIG. 1) of the electrode plates 3 of one polarity, and the bundled structure 7 is positioned at a lowermost layer (as shown in FIG. 1) of the electrode plates 3 of opposite polarity.

The separator 2 is preferably made of any of resins including polyolefins such as polyethylene, polypropylene, etc. and their copolymers, and resin materials commercially available as ordinary filter membranes, including polyamide, polycarbonate, aromatic polyamide, fluoroplastics, etc. as they are insoluble in an organic solvent of ester, ketone, ether, or the like which is used in ordinary secondary cells.

The polyolefins such as polyethylene, polypropylene, etc. and their copolymers are preferable in that they are highly resistant to chemicals and inexpensive, and have a shutdown capability when used in capacitors. Because the polyamide and polycarbonate are higher in mechanical strength than polyolefins, they are preferable for use in capacitors in that they have excellent mechanical strength against external forces applied to compress the electrodes of the capacitors. The aromatic polyamide and fluoroplastics (tetrafluoroethylene, vinylidene fluoride, etc.) are preferable in that they have excellent chemical and thermal resistance, and can withstand use in dry conditions at high temperatures when used in capacitors.

Any one of the resin materials for the separator 2 may be selected in view of the above characteristics depending on the usage and type of the capacitor, and may be elongated, fiberized, or coated on another porous material, producing a porous film. Alternatively, films of resin materials may be laminated into a composite film.

If each of the resin materials for the separator 2 is used as a single film, then since it can be formed as a very thin film with its thickness reduced to several $\mu$m, it allows for a high-density electrode packing ability which is a feature of the present invention. These resin materials permit the separator 2 to be flexibly folded into a meandering shape, assuring an insulating capability at the folded areas.

If films of resin materials are laminated into a composite film, then the composite film provides excellent durability against external forces which tend to compress the electrodes. Even if one of the films of the resin materials is damaged, the desired insulation capability is maintained by the remaining films.

Care should be exercised in using polycarbonate as it may be soluble in propylene carbonate (PC).

The electrolytic solution with which the separator 2 is impregnated preferably comprises a solution of tetraethyl ammonium tetrafluoroborate (TEATFB) dissolved in a solvent such as of propylene carbonate (PC), γ-butylolactone (GBL), γ-valerolactone (GVL). Inasmuch as the solvent such as of propylene carbonate, γ-butylolactone, γ-valerolactone has a high permittivity and an excellent ability to dissolve electrolytes, it can provide high electric conductivity. When the electrode plates are packed at a high density, the high electric conductivity permits the electrode plates to have reduced electric resistance. Because the electrolytic solution is of a low viscosity, it can permeate well through minute pores in the electrode plates.

If the solvent comprises propylene carbonate (PC), then the electric conductivity of the electrolytic solution is higher as the concentration of the tetraethyl ammonium tetrafluoroborate (TEATFB) is higher. For stable solubility, the concentration of the tetraethyl ammonium tetrafluoroborate (TEATFB) in the electrolytic solution is preferably of about 1 mol per liter of the propylene carbonate (PC). However, the concentration of the electrolytic solution may be lower than 1 mol/liter, and should not limit the features of the electric double-layer capacitor according to the present invention.

Each of the electrode plates 3 comprises a sheet, a belt, or an otherwise planar body of activated carbon in a powdery, granular, or fibrous form which is mixed with a binder of polytetrafluoroethylene (PTFE), cellulose, pullulan, gum Arabic, PVA, PVDF, acrylic curdlan, bluten, or the like. The activated carbon may be mixed with an electric conductive material such as ketjen black, acetylene black, graphite, metal powder, or the like.

Alternately, each of the electrode plates 3 may comprise a cloth of fibrous activated carbon. The electrode plates 3 in the form of a cloth of fibrous activated carbon allow the electrolytic solution to permeate easily into the electrode plates 3, and hence have reduced electric resistance, and do not need any binder and electric conductive material.

Since the electrode plates 3 in the form of a cloth of fibrous activated carbon are pliable to a certain extent, they are less liable to damage the separator 2. Furthermore, the electrode plates 3 in the form of a cloth of fibrous activated carbon permit the capacitor elements to be pressed when they are assembled, the electrode plates 3 and the collectors 4 may be reduced in electric resistance, and the capacitance of the capacitor may be increased.

The activated carbon may be manufactured by carbonizing coconut shell, pitch, petroleum coke, phenol, sawdust, or the like and activating the carbonized material with steam or potassium hydroxide (KOH). The fibrous activated carbon should preferably be a phenol material in view of the ease with which it can be processed into a cloth. The activated carbon has a specific surface area ranging from 100 to 3000 $m^2/g$.

Each of the flexible collectors 4 comprises an aluminum foil having a thickness of about 0.1 mm. The flexible collectors 4 are preferably made of aluminum or an aluminum-base metal such as an aluminum alloy or the like which allows operation in a wide voltage range, is lightweight, and has excellent workability. The flexible collectors 4 may be made of a metal such as nickel, titanium, copper, iron, or the like or an alloy thereof though they may be subject to operating voltage limitations.

Figure 2:
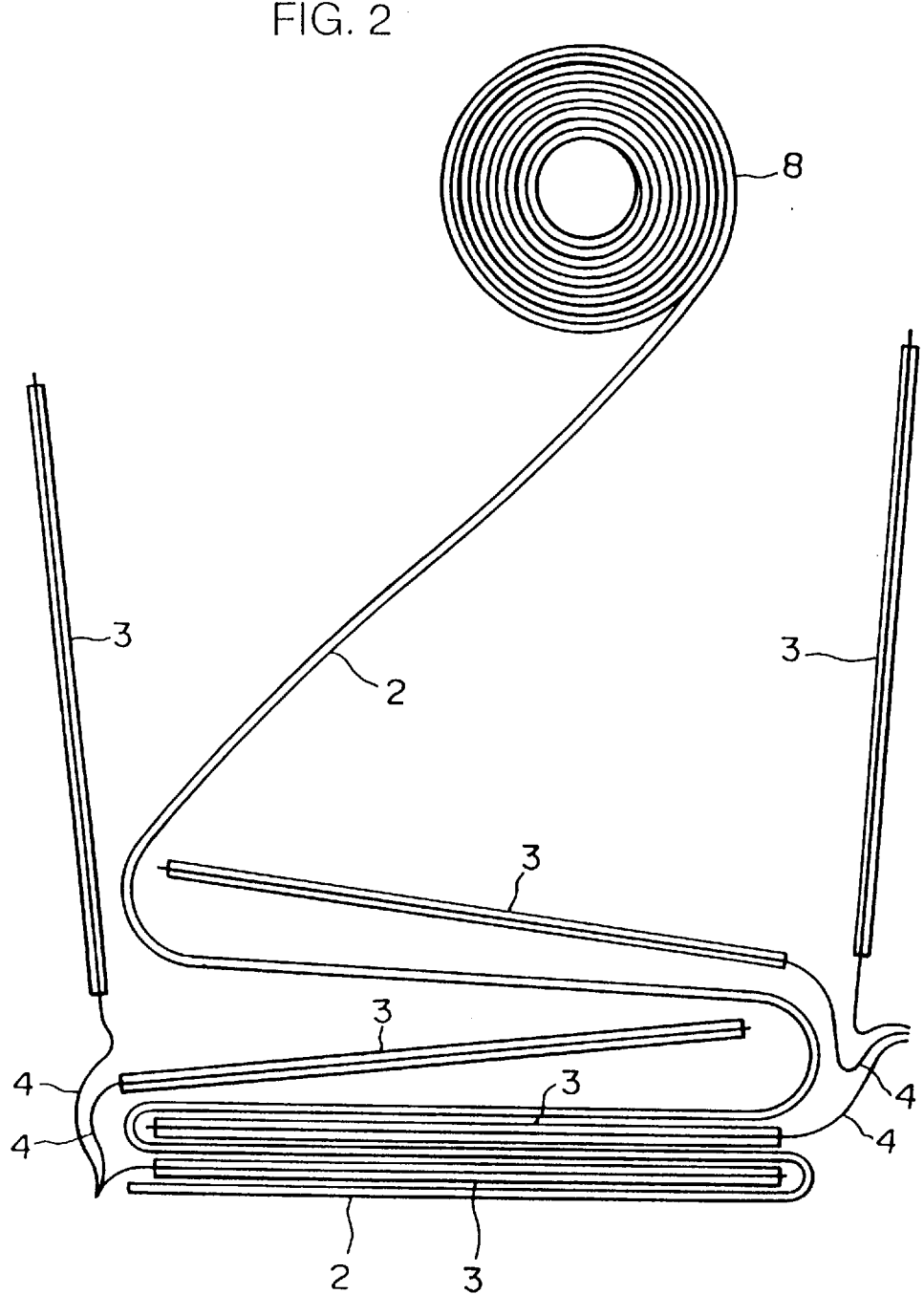
FIG. 2 is a cross-sectional view illustrative of the manner in which the electric double-layer capacitor shown in FIG. 1 is manufactured.

As shown in FIG. 2, the electric double-layer capacitor 1 is manufactured with ease by placing an electrode plate 3 on the separator 2 unreeled from a coil of separator on a supply reel 8, folding the separator 2 back on the placed electrode plate 3, placing another electrode plate 3 on the folded separator 2, and repeating such a process of placing an electrode plate 3 and folding the separator 2 back on the electrode plate 3.

As described above, the bundled structures 6, 7 are positioned respectively at uppermost and lowermost layers (as shown in FIG. 1) of the electrode plates 3. Consequently, a plurality of unit cells each comprising the electric double-layer capacitor 1 may be stacked in the direction in which the electrode plates 3 are stacked, and connected in series, thereby providing a capacitor device.

Figure 3:
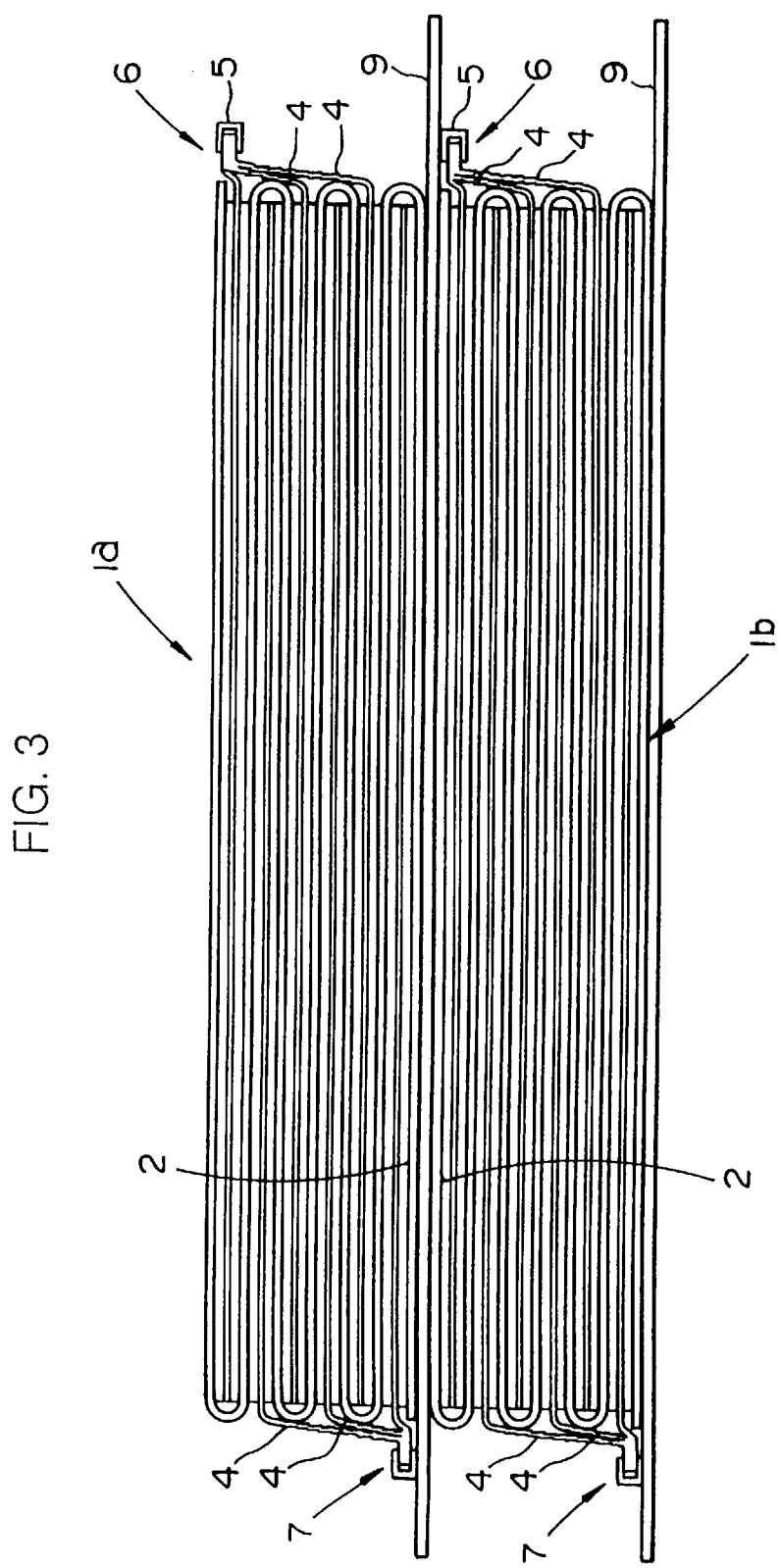
FIG. 3 is a cross-sectional view of a series-connected assembly of electric double-layer capacitors shown in FIG. 1.

FIG. 3 shows in cross section a series-connected assembly of electric double-layer capacitors 1a, 1b each of the structure shown in FIG. 1. As shown in FIG. 3, an electrically conductive plate 9 is interposed between confronting layers of the separators 2 of the electric double-layer capacitors 1a, 1b, and another electrically conductive plate 9 is held against a lowermost layer of the separator 2 of the electric double-layer capacitor 1b. The bundled structure 7 positioned at the lowermost layer of the electrode plates 3 of the electric double-layer capacitor 1a is connected to one end of the electrically conductive plate 9 disposed between the electric double-layer capacitors 1a, 1b, and the bundled structure 6 positioned at the uppermost layer of the electrode plates 3 of the electric double-layer capacitor 1b is connected to the other end of the electrically conductive plate 9 disposed between the electric double-layer capacitors 1a, 1b. Therefore, the bundled structure 7 of the electric double-layer capacitor 1a and the bundled structure 6 of the electric double-layer capacitor 1b are connected to each other through the electrically conductive plate 9 disposed between the electric double-layer capacitors 1a, 1b.

Each of the electrically conductive plates 9 comprises a sheet of aluminum or aluminum alloy having a thickness of about 0.5 mm. The electrically conductive plates 9 are preferably made of aluminum or aluminum alloy which allows operation in a wide voltage range. The electrically conductive plates 9 may be made of a metal such as nickel, titanium, copper, iron, or the like or an alloy thereof though they may be subject to operating voltage limitations.

Figure 4:
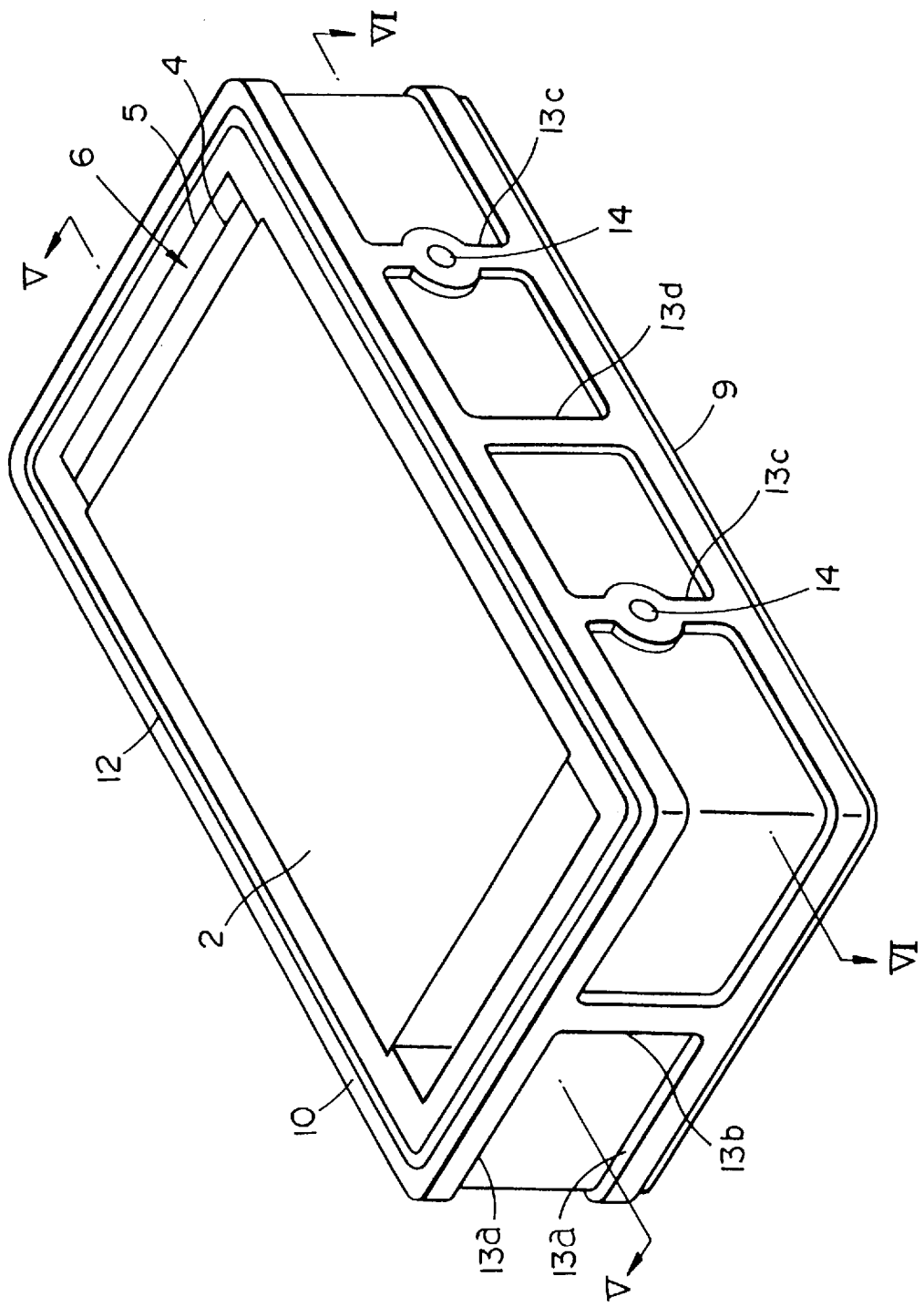
FIG. 4 is a perspective view of a unit cell of a capacitor device according to the present invention.
Figure 5:
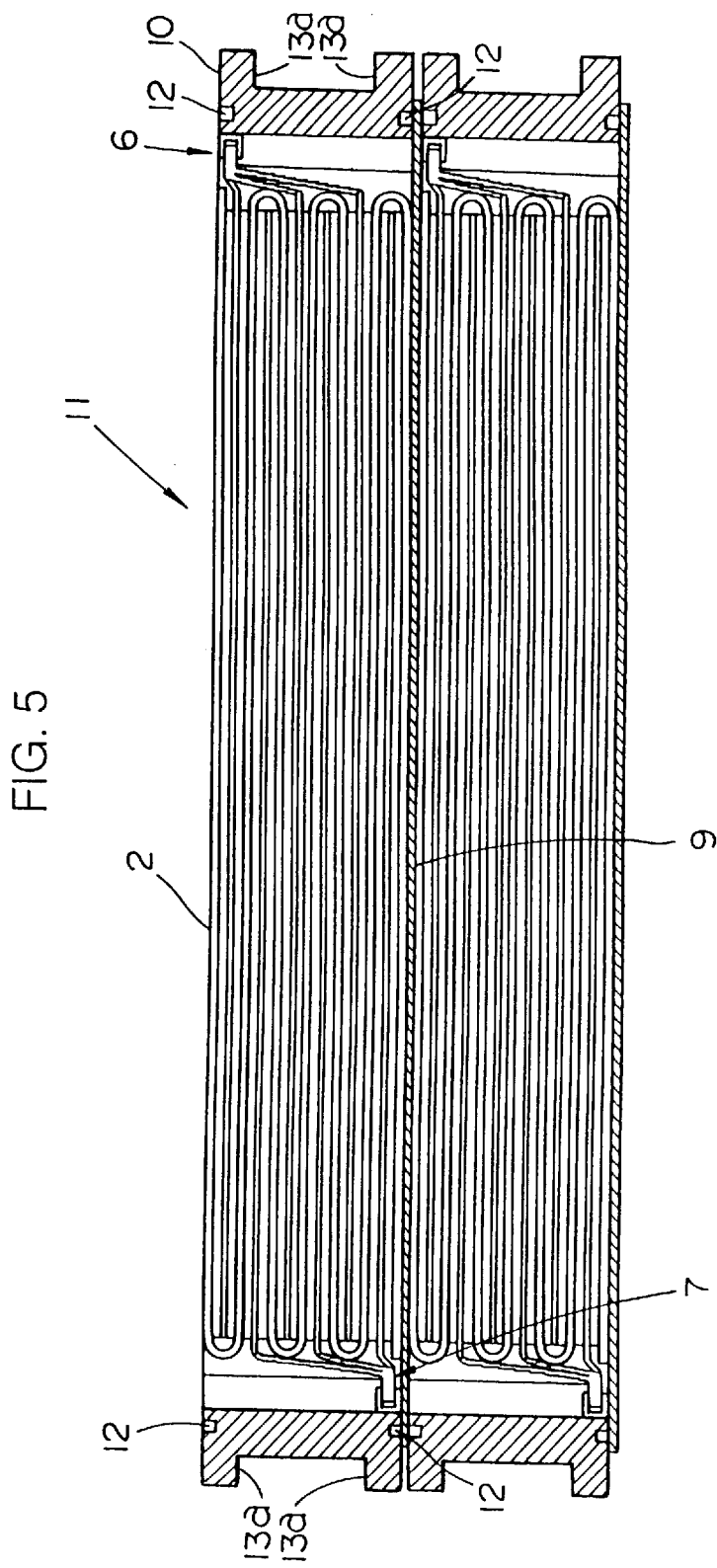
FIG.5 is a cross-sectional view taken along line V—V of FIG. 4.
Figure 6:
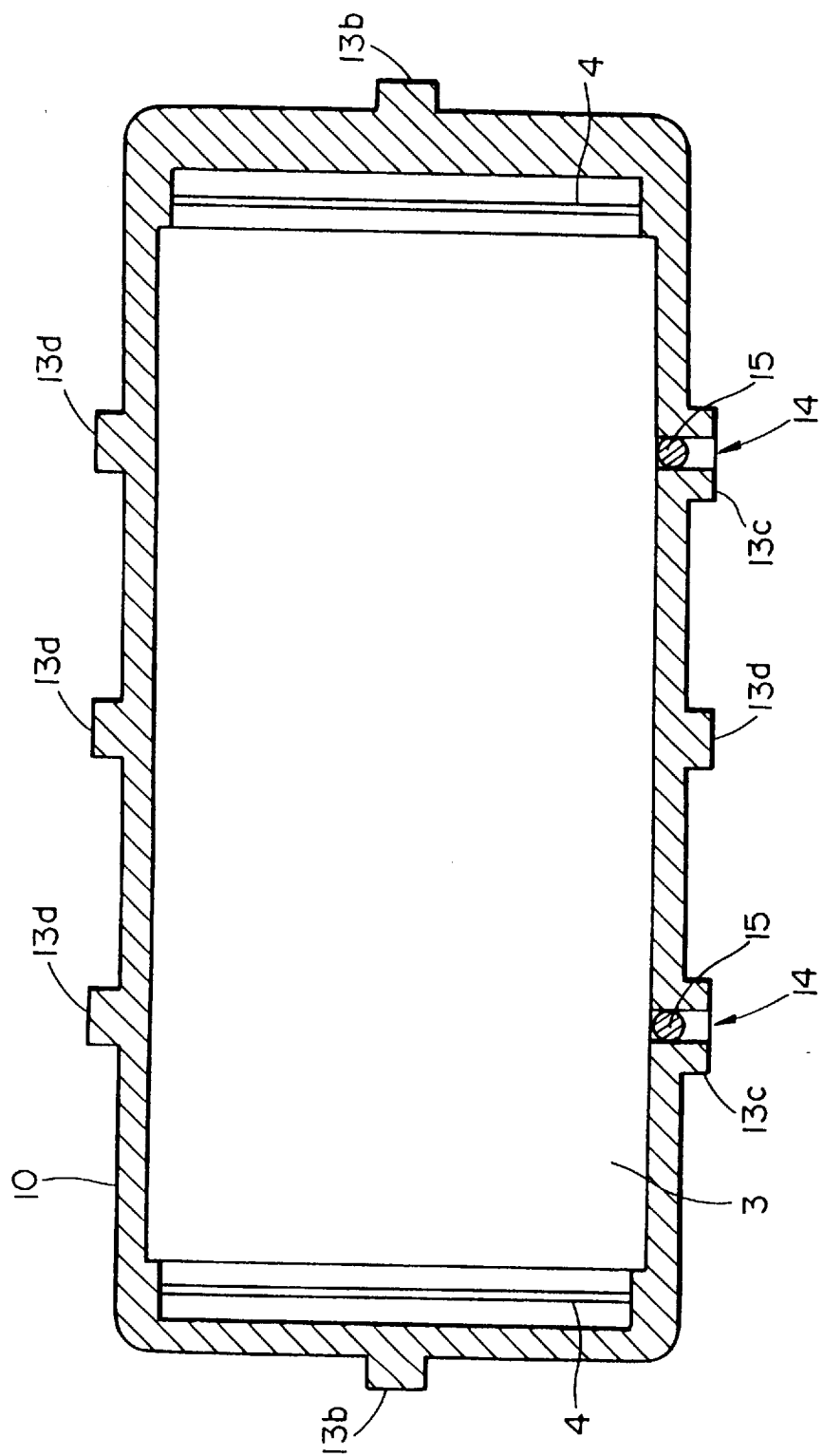
FIG. 6 is a cross-sectional view taken along line VI—VI of FIG. 4.

When a plurality of electric double-layer capacitors 1 are stacked, they are housed in respective cases 10 shown in FIGS. 4 through 6. The cases 10 are made of an electrically nonconductive synthetic resin of polytetrafluoroethylene (PTFE).

Each of the cases 10 is of a tubular shape having upper and lower open ends, and surrounds the sides of the stacked electrode plates 3 of the electric double-layer capacitor 1 which is housed in the case 10. When the electric double-layer capacitor 1 is housed in the case 10, the separator 2 and the bundled structure 6 are disposed and exposed in one of the open ends, i.e., the upper open end, of the case 10, and the electrically conductive plate 9 to which the bundled structure 7 is welded is disposed and exposed in the other open end, i.e., the lower open end, of the case 10. The case 10 and the electric double-layer capacitor 1 housed therein jointly make up a unit cell 11. The case 10 has grooves 12 defined respectively in upper and lower edges thereof extending around the upper and lower open ends. The grooves 12 serve to receive sealing members (not shown).

The case 10 also has on its outer side surfaces two horizontal ribs 13*a* extending along the upper and lower edges thereof and a plurality of vertical ribs 13*b*, 13*c*, 13*d* vertically interconnecting the two horizontal ribs 13*a*. The vertical ribs 13*b* which are disposed on a side wall of the case 10 have communication holes 14 defined therein which extend through the side wall of the case 10 from the outer side surface to an inner side surface of the case 10.

The communication holes 14 serve as inlet holes for introducing an electrolytic solution to be impregnated in the separator 2. After the electrolytic solution is introduced through the communication holes 14 into the case 10, balls 15 are inserted into the respective communication holes 14 as shown in FIG. 6. The balls 15 are made of the same synthetic resin as the case 10, i.e., polytetrafluoroethylene (PTFE), and are inserted to seal and close the communication holes 14. When the internal pressure in a capacitor device 16 (see FIG. 7), which comprises a stack of unit cells 11, increases, the balls 15 are forced out of the communication holes 14 under the internal pressure buildup, allowing the interior and exterior spaces of the capacitor device 16 to communicate with each other through the communication holes 14.

Figure 7:
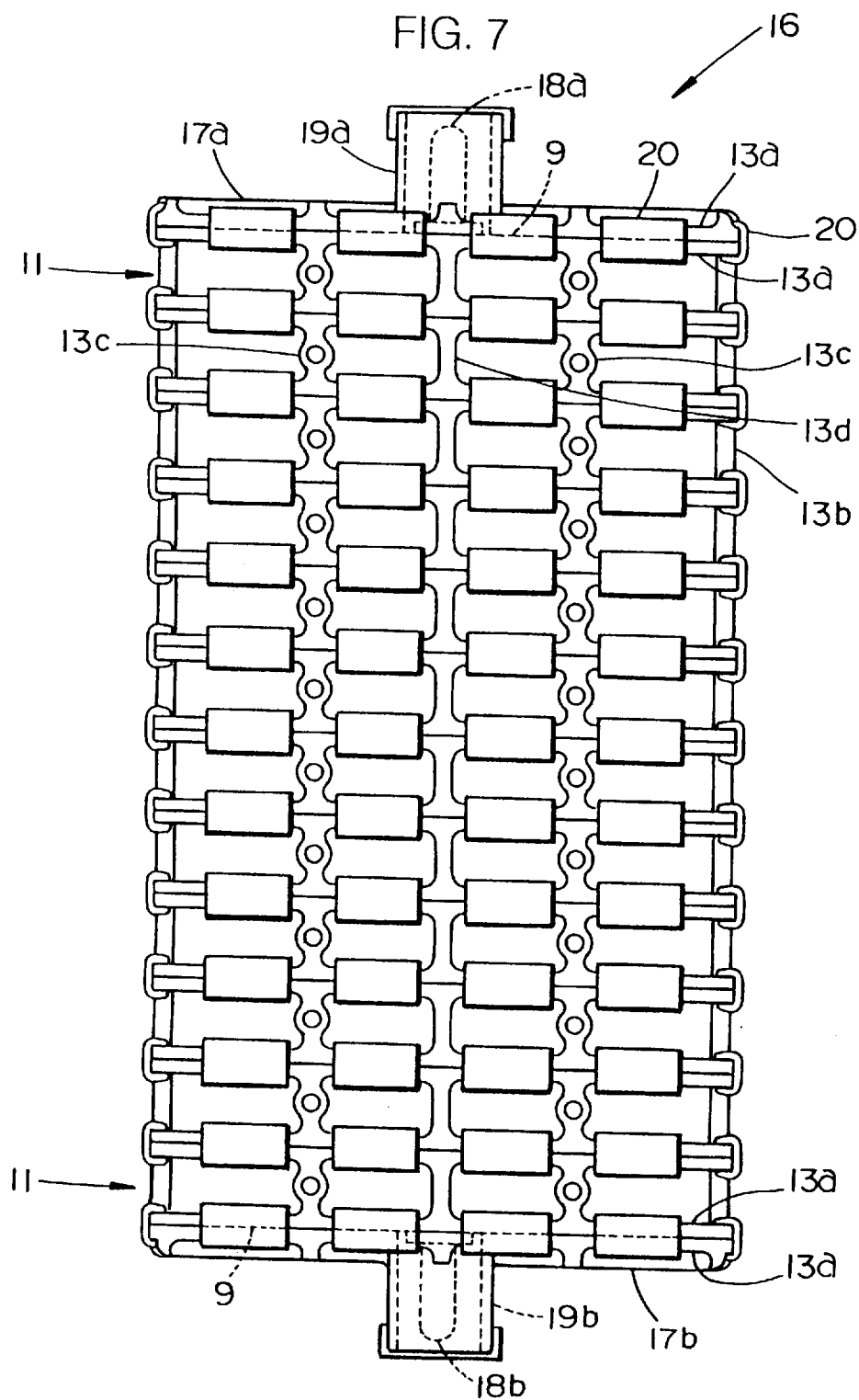
FIG. 7 is a front elevational view of the capacitor device according to the present invention.

As shown in FIG. 7, the capacitor device 16 comprises a plurality of unit cells 11 stacked in the direction in which the electrode plates 3 are stacked in each of the unit cells 11. The capacitor device 16 includes end plates 17*a*, 17*b* mounted respectively on upper and lower ends thereof.

The end plate 17*a* is made of the same synthetic resin as the case 10, i.e., polytetrafluoroethylene (PTFE), and is of such a shape as to close the upper open end of the case 10 of the uppermost unit cell 11 of the capacitor device 16. The end plate 17*a* has a horizontal rib 13*a* extending along the lower edge thereof, the horizontal rib 13*a* being similar to the horizontal ribs 13*a*, 13*b* of the case 10. The end plate 17*a* also has a socket 19*a* mounted centrally on an upper surface thereof and housing a terminal 18*a* therein. The terminal 18*a* of the end plate 17*a* is connected to an electrically conductive plate 9 which is held against the lower end of the end plate 17*a* and connected to the bundled structure 6 (not shown in FIG. 7) of the electric double-layer capacitor 1 which is housed in the uppermost unit cell 11 disposed adjacent to the end plate 17*a*.

The end plate 17*b* is of the same material and structure as the end plate 17*a*, and is of such a shape as to close the lower open end of the case 10 of the lowermost unit cell 11 of the capacitor device 16. The end plate 17*b* has a horizontal rib 13*a* extending along the upper edge thereof, the horizontal rib 13*a* being similar to the horizontal ribs 13*a*, 13*b* of the case 10. The end plate 17*b* also has a socket 19*b* mounted centrally on a lower surface thereof and housing a terminal 18*b* therein. The terminal 18*b* of the end plate 17*b* is connected to the electrically conductive plate 9 of the lowermost unit cell 11 disposed adjacent to the end plate 17*b*.

The unit cells 11 and the end plates 17*a*, 17*b* are interconnected by clips 20. The electric double-layer capacitors 1 which are series-connected are sealed in a space defined by the cases 10 and the end plates 17*a*, 17*b*, thereby making up the capacitor device 16.

As shown in FIG. 7, each of the clips 20 is of a C-shaped cross section and is resilient. When the horizontal ribs 13*a* of two adjacent unit cells 11 or the horizontal ribs 13*a* of a unit cell 11 and either the end plate 17*a* or the end plate 17*b* are fitted in the opening of the clip 20, the horizontal ribs 13*a* are resiliently held together by the clip 20. There are two clips 20 positioned one on each side of the vertical rib 13*b* on each of the shorter sides of each unit cell 11, and four clips 20 positioned one on each side of the vertical clips 13*c*, 13*d* on each of the longer sides of each unit cell 11.

After the unit cells 11 and the end plates 17*a*, 17*b* are interconnected, an electrolytic solution of tetraethyl ammonium tetrafluoroborate (TEATFB) added at a ratio of 1 mol per liter of the propylene carbonate (PC) is introduced through the communication holes 14 into the unit cells 11, impregnating the separators 2. After the electrolytic solution is introduced, the balls 15 are inserted into the communication holes 14, sealing the unit cells 11, whereupon the capacitor device 16 is completed. The capacitor device 16 thus completed can be charged and discharged through the terminals 18*a*, 18*b*.

In an experiment, 12 unit cells 11 each having an electrostatic capacity of 1000 F were series-connected, providing a capacitor device 16 having an electrostatic capacity of 83.3 F and an internal resistance of 7.86 mI. The capacitor device 16 was capable of outputting an electric energy of 2 kW for 10 seconds, i.e., 20 kJ, at a rated voltage ranging from 15 to 30 V and a rated current of 125 A.

Figure 8:
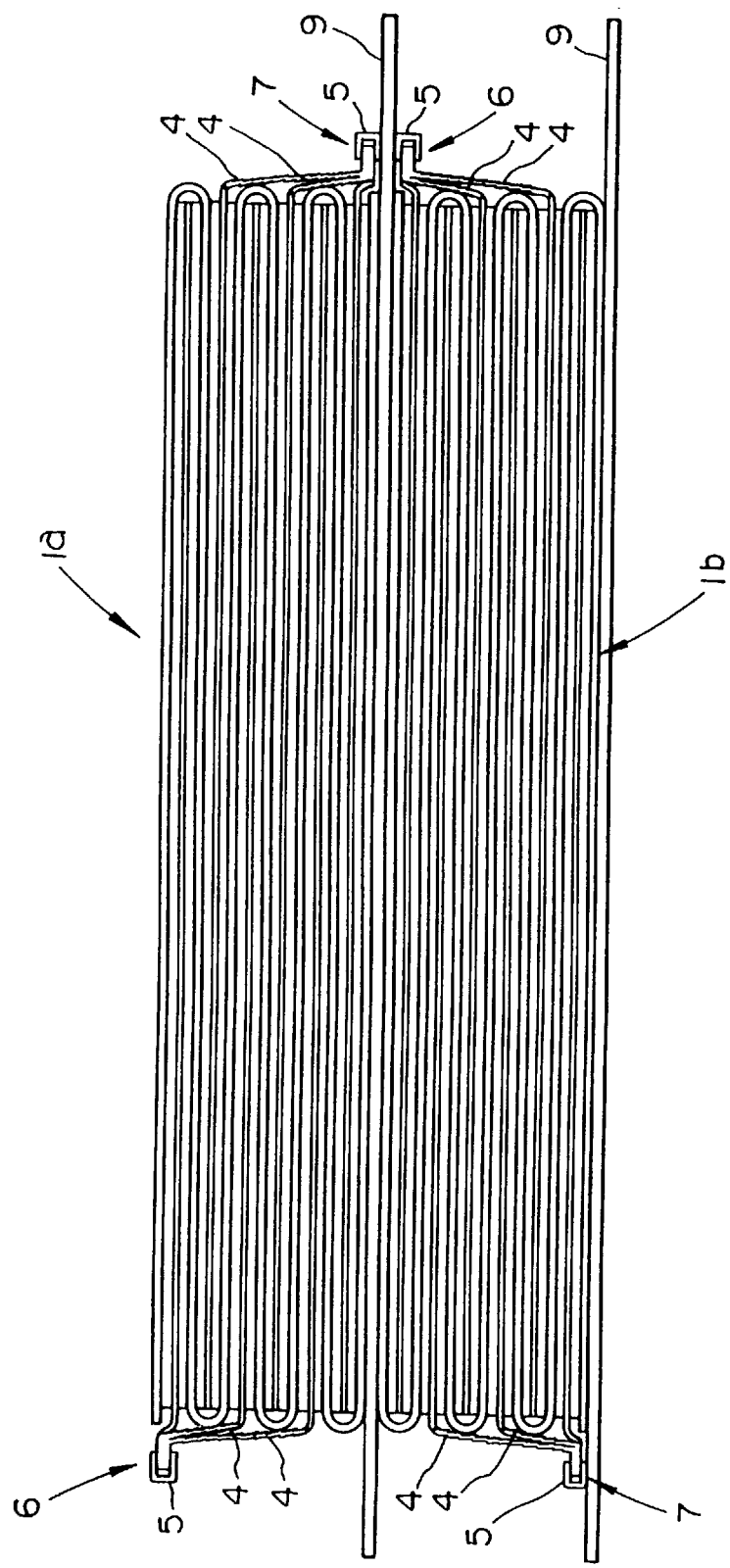
FIG. 8 is a cross-sectional view of another series-connected assembly of electric double-layer capacitors shown in FIG. 1.

In the above embodiment, as shown in FIG. 3, the electric double-layer capacitors 1*a*, 1*b* which are oriented in the same direction are stacked with the electrically conductive plate 9 interposed between their separators 2. In FIG. 8, however, the electric double-layer capacitors 1*a*, 1*b* are oriented in axial symmetry with respect to the electrically conductive plate 9 interposed between their separators 2. In the assembly shown in FIG. 8, the bundled structure 7 which interconnects the collectors 4 of the electric double-layer capacitor 1*a* and the bundled structure 6 which interconnects the collectors 4 of the electric double-layer capacitor 1*b* are connected to the same end of the electrically conductive plate 9. As a result, the internal resistance of the series-connected electric double-layer capacitors 1*a*, 1*b* is reduced.

In the case where the electric double-layer capacitors 1*a*, 1*b* are oriented in axial symmetry with respect to the electrically conductive plate 9 interposed between their separators 2, as shown in FIG. 8, the bundled structure 7 which interconnects the collectors 4 of the electric double-layer capacitor 1*a* and the bundled structure 6 which interconnects the collectors 4 of the electric double-layer capacitor 1*b* may be connected directly to each other without the intermediary of the electrically conductive plate 9.

Figure 9:
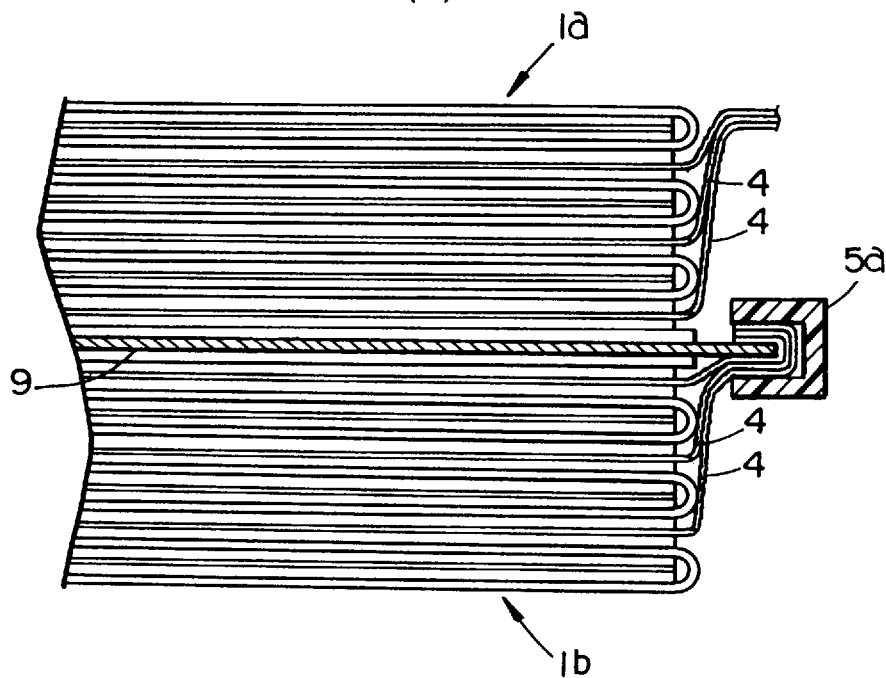
FIGS. 9(a) and 9(b) are fragmentary cross-sectional views of other structures by which collectors of the electric double-layer capacitor shown in FIG. 1 are bundled.
Figure 9:
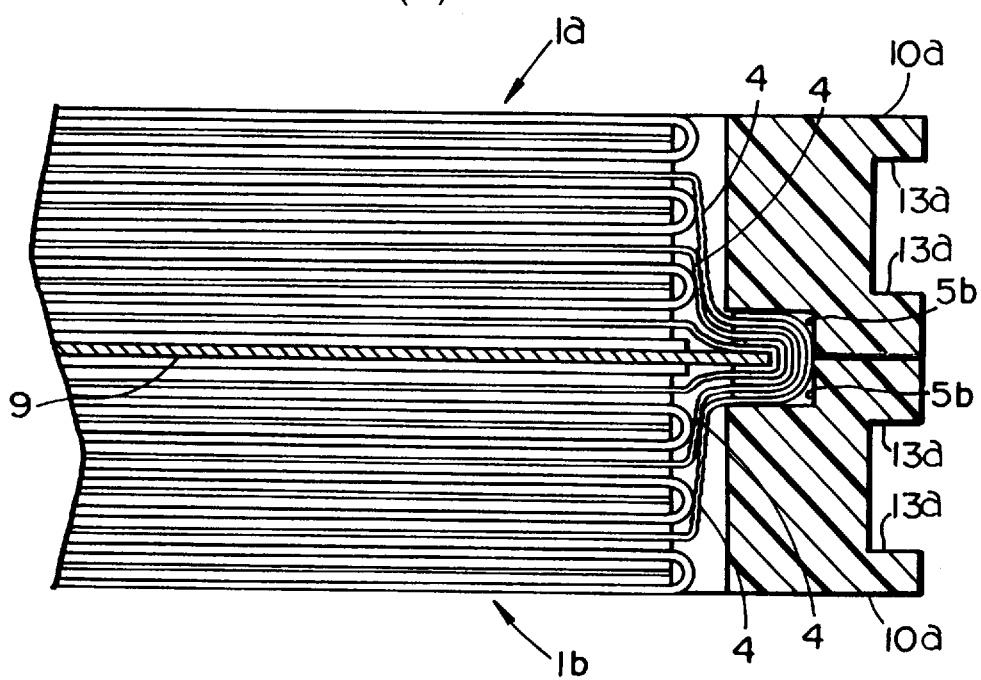

In the above embodiments, the collectors 4 of different polarities are bundled into the bundled structures 6, 7 by the fasteners 5, and the bundled structures 6, 7 are fused to the electrically conductive plate 9 through the fasteners 5. However, as shown in FIG. 9(*a*), the ends of the collectors 4 of each polarity may be disposed in wrapping relation to an end of the electrically conductive plate 9 and clamped on the electrically conductive plate 9 by a clip 5*a*. With the arrangement shown in FIG. 9(*a*), since the collectors 4 are bundled in direct contact with the electrically conductive plate 9, it is not necessary to fuse any fasteners to the electrically conductive plate 9 in connecting the collectors 4 thereto. The clip 5*a* may not be of an electrically conductive material, but may be of a synthetic resin such as polytetrafluoroethylene (PTFE), insofar as it is resilient enough to retain the collectors 4 on the electrically conductive plate 9.

If the electric double-layer capacitors 1*a*, 1*b* are oriented in axial symmetry with respect to the electrically conductive plate 9 interposed between their separators 2, as shown in FIG. 8, then, as shown in FIG. 9(b), the ends of the collectors 4 of different polarities of the electric double-layer capacitors 1a, 1b may be disposed in wrapping relation to an end of the electrically conductive plate 9, and the wrapped end of the electrically conductive plate 9 may be clamped between two adjacent cases 10a which have respective recesses 5b that receive the wrapping ends of the collectors 4. Since the end of the electrically conductive plate 9 wrapped by the ends of the collectors 4 are fitted in the recesses 5b, the collectors 4 are held in direct contact with the electrically conductive plate 9.

Figure 10:
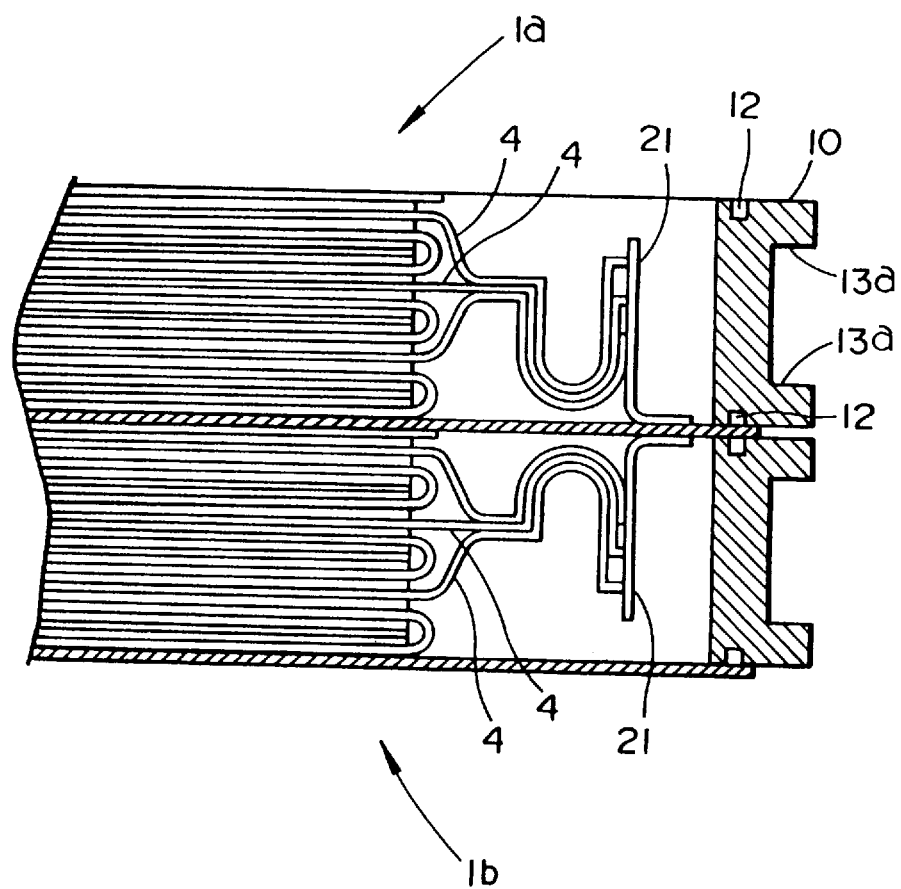
FIG. 10 is a fragmentary cross-sectional view of still another structure by which collectors of the electric double-layer capacitor shown in FIG. 1 are bundled.

FIG. 10 shows still another structure by which the ends of the collectors 4 of each polarity are bundled together and fused to a collector plate 21 of an electrically conductor material that is in turn fused to the electrically conductive plate 9.

Figure 11:
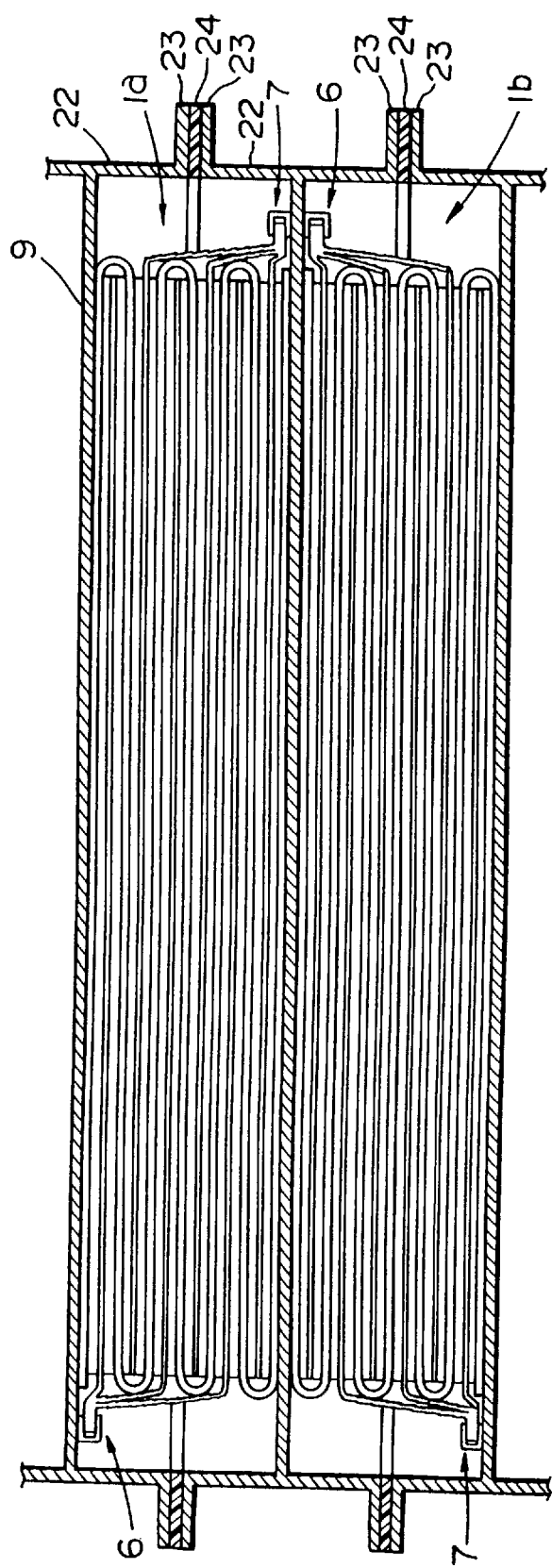
FIG. 11 is a cross-sectional view of another unit cell of a capacitor device according to the present invention.
Figure 12:
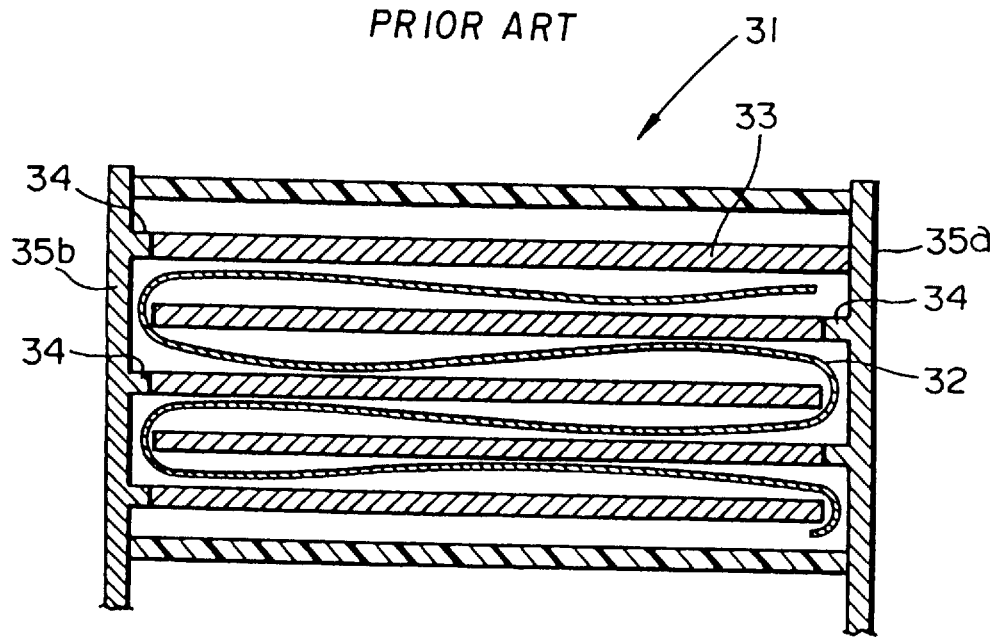
FIG. 12 is a cross-sectional view of a conventional electric double-layer capacitor.

In the above embodiments, the cases 10, 10a are made of an electrically nonconductive synthetic resin of polytetrafluoroethylene (PTFE). However, as shown in FIG. 11, a tubular case 22 having upper and lower open ends may be made of aluminum, and an electrically conductive plate 9 extending in and across the case 22 may be integrally formed with the case 22. The case 22 has horizontal ribs 23 extending respectively along upper and lower edges and communication holes (not shown) for introducing an electrolytic solution.

The electric double-layer capacitor 1a has its lower half disposed above the electrically conductive plate 9 and housed in an upper space defined by the electrically conductive plate 9 and the case 22, and the electric double-layer capacitor 1b has its upper half disposed beneath the electrically conductive plate 9 and housed in a lower space defined by the electrically conductive plate 9 and the case 22. The bundled structure 7 interconnecting the collectors 4 of the electric double-layer capacitor 1a and the bundled structure 6 interconnecting the collectors 4 of the electric double-layer capacitor 1b are connected to the same end of the electrically conductive plate 9.

A plurality of cases 22 are stacked to provide a capacitor device. Since the case 22 is electrically conductive by itself, the plural cases 22 are stacked with insulating members 24, made of an electrically nonconductive synthetic resin of polytetrafluoroethylene (PTFE), being interposed therebetween. The electric double-layer capacitor 1a has its lower half disposed above the electrically conductive plate 9 and housed in an upper space defined by the electrically conductive plate 9 and the case 22, and its upper half disposed below the electrically conductive plate 9 of an adjacent case 22 and housed in a lower space defined by the electrically conductive plate 9 and the adjacent case 22.

The horizontal ribs 23 of the adjacent cases 22 are clamped by clips (not shown), thereby joining the cases 22 together.

In FIG. 11, the electric double-layer capacitors 1a, 1b are oriented in axial symmetry with respect to the electrically conductive plate 9. However, the electric double-layer capacitors 1a, 1b may be oriented in the same direction as shown in FIG. 3.

Although certain preferred embodiments of the present invention have been shown and described in detail, it should be understood that various changes and modifications may be made therein without departing from the scope of the appended claims.

What is claimed is:

1. An electric double-layer capacitor comprising:
   an elongate separator impregnated with an electrolytic solution and folded alternately in different directions into folded layers of a predetermined length;
   a plurality of stacked electrode plates each disposed between adjacent two of the folded layers of said separator, the electrode plates having opposite polarities confronting each other through the folded layers of said separator; and
   a plurality of flexible collectors connected to respective ends of said electrode plates and extending from between the folded layers of said separator, said flexible collectors of each of the polarities being bundled in a direction parallel to said electrode plates on one side of said electrode plates and disposed at an outermost layer of the electrode plates with respect to a direction in which the electrode plates are stacked.

2. A capacitor device comprising:
   a plurality of electric double-layer capacitors each comprising:
      an elongate separator impregnated with an electrolytic solution and folded alternately in different directions into folded layers of a predetermined length;
      a plurality of stacked electrode plates each disposed between adjacent two of the folded layers of said separator, the electrode plates having opposite polarities confronting each other through the folded layers of said separator; and
      a plurality of flexible collectors connected to respective ends of said electrode plates and extending from between the folded layers of said separator, said flexible collectors of each of the polarities being bundled in a direction parallel to said electrode plates on one side of said electrode plates and disposed at an outermost layer of the electrode plates with respect to a direction in which the electrode plates are stacked;
   said electric double-layer capacitors being stacked in the direction in which said electrode plates are stacked, the bundled flexible collectors of one polarity of one of said electric double-layer capacitors being connected to the bundled flexible collectors of a different polarity of an adjacent one of said electric double-layer capacitors.

3. A capacitor device according to claim 2, further comprising an electrically conductive plate disposed between the electric double-layer capacitors and extending along the electrode plates with the separators interposed therebetween, wherein the bundled flexible collectors of said one polarity of said one of said electric double-layer capacitors are connected to an end of said electrically conductive plate, and the bundled flexible collectors of said different polarity of said adjacent one of said electric double-layer capacitors are connected to an opposite end of said electrically conductive plate.

4. A capacitor device according to claim 2, wherein the bundled flexible collectors of said one polarity of said one of said electric double-layer capacitors and the bundled flexible collectors of said different polarity of said adjacent one of said electric double-layer capacitors are connected to each other in a direction parallel to said electrode plates on one side of said electrode plates.

5. A capacitor device according to claim 4, further comprising an electrically conductive plate disposed between the electric double-layer capacitors and extending along the electrode plates with the separators interposed therebetween, wherein said bundled flexible collectors are connected to said electrically conductive plate.

6. A capacitor device according to claim 5, further comprising a plurality of tubular electrically nonconductive cases each having upper and lower open ends, said electric double-layer capacitors being housed respectively in said cases and surrounded respectively thereby on side surfaces thereof parallel to the direction in which the electrode plates are stacked, said cases being stacked with said electrically nonconductive plate interposed therebetween and joined to each other in sandwiching relation to said electrically nonconductive plate.

7. A capacitor device according to claim 6, wherein each of said electrically nonconductive cases has ribs extending along the upper and lower open ends thereof, further comprising clips which clamp the rib along one of the upper and lower open ends of each of said electrically nonconductive cases and the rib along the other of the upper and lower open ends of an adjacent one of said electrically nonconductive cases, thereby interconnecting said electrically nonconductive cases.

8. A capacitor device according to claim 6, further comprising electrically nonconductive closure members closing said upper and lower open ends of the stacked cases with the electrically conductive plates interposed therebetween.

9. A capacitor device according to claim 8, wherein each of said closure members has a socket and a terminal disposed in said socket and connected to the electrically conductive plate.

10. A capacitor device according to claim 8, wherein each of said closure members has a rib extending along an outer edge thereof, further comprising clips which clamp the rib along the outer edge of each of said closure members and the rib along the upper and lower open ends of adjacent ones of said electrically nonconductive cases, thereby interconnecting said closure members and said electrically nonconductive cases.

11. A capacitor device according to claim 6, wherein each of said electrically nonconductive cases has an inlet hole for introducing an electrolytic solution therethrough to impregnate said separator, further comprising a closure element for closing said inlet hole after the electrolytic solution is introduced through said inlet hole.

12. A capacitor device according to claim 2, further comprising a plurality of tubular electrically conductive cases each having upper and lower open ends and an integral electrically conductive plate extending therein and thereacross, said electric double-layer capacitors being housed respectively in spaces defined by said cases and the electrically conductive plate thereof with the electrically conductive plate sandwiched between the electric double-layer capacitors, and surrounded by the cases on side surfaces thereof parallel to the direction in which the electrode plates are stacked, said cases being stacked with insulating members interposed therebetween and joined to each other.

13. A capacitor device according to claim 12, wherein each of said electrically conductive cases has ribs extending along the upper and lower open ends thereof, further comprising clips which clamp the rib along one of the upper and lower open ends of each of said electrically conductive cases and the rib along the other of the upper and lower open ends of an adjacent one of said electrically conductive cases, thereby interconnecting said electrically conductive cases.

14. A capacitor device according to claim 12, wherein each of said electrically conductive cases has an inlet hole for introducing an electrolytic solution therethrough to impregnate said separator, further comprising a closure element for closing said inlet hole after the electrolytic solution is introduced through said inlet hole.

15. An electric double-layer capacitor comprising:

a stack of electrically interconnected double layer capacitor cells, wherein each cell includes a) a plurality of electrode plates, the electrode plates of opposite polarities being opposed to one another with a separator therebetween, with electrodes of the same polarity in each cell electrically connected to one another in parallel, and b) a plurality of flexible collectors, said flexible collectors of each of the polarities being bundled in a direction parallel to said electrode plates on one side of said electrode plates; and a low resistance, electrically conducting pathway between adjacent cells in the stack providing a series electrical connection between adjacent stacked cells.

16. An electric double-layer capacitor of claim 15, wherein the electrode plates are electrically connected to one another by metallic foil collectors.

17. An electric double-layer capacitor of claim 16, wherein a collector is attached to each electrode plate.

18. An electric double-layer capacitor of claim 15, wherein the low resistance electrically conducting pathway between adjacent cells comprises at least one electrically conductive plate that forms a common wall of adjacent cells disposed between adjacent double layer capacitor cells.

19. An electric double-layer capacitor comprising:

a plurality of electrically interconnected double layer capacitor cells stacked upon one another, each cell disposed within a case of plastic resin; and at least one terminal at a surface of each case which provides a low resistance electrical pathway between the double layer capacitor cells;

wherein each cell includes a) a plurality of electrode plates, with the electrode plates of opposite polarities being opposed to one another with a separator therebetween, and electrodes of the same polarity, electrically connected to one another in parallel and b) a plurality of flexible collectors, said flexible collectors of each of the polarities being bundled in a direction parallel to said electrode plates on one side of said electrode plates.

* * * * *